United States Patent [19]

Grewell

[11] Patent Number: 5,855,706

[45] Date of Patent: Jan. 5, 1999

[54] SIMULTANEOUS AMPLITUDE AND FORCE PROFILING DURING ULTRASONIC WELDING OF THERMOPLASTIC WORKPIECES

[75] Inventor: David A. Grewell, New Haven County, Conn.

[73] Assignee: Branson Ultrasonics Corporation, Danbury, Conn.

[21] Appl. No.: 848,683

[22] Filed: Apr. 29, 1997

Related U.S. Application Data

[63] Continuation-in-part of Ser. No. 506,104, Jul. 24, 1995, Pat. No. 5,658,408, which is a continuation-in-part of Ser. No. 221,047, Mar. 31, 1994, Pat. No. 5,435,863, which is a continuation-in-part of Ser. No. 871,692, Apr. 21, 1992, abandoned.

[51] Int. Cl.$^6$ ................................................. B32B 31/00
[52] U.S. Cl. ........................... 156/64; 156/73.1; 156/358; 156/359; 156/580.1
[58] Field of Search ........................... 156/64, 73.1, 73.3, 156/73.4, 358, 359, 580.1, 580.2; 264/442, 443, 445; 425/174.2

[56] References Cited

U.S. PATENT DOCUMENTS

| | | | |
|---|---|---|---|
| 3,432,691 | 3/1969 | Shoh | 310/316 |
| 3,469,211 | 9/1969 | Shoh et al. | 311/116 R |
| 3,733,238 | 5/1973 | Long et al. | 156/580.1 |
| 4,618,516 | 10/1986 | Sager | 156/73.1 X |
| 4,631,685 | 12/1986 | Peter | 156/73.1 X |
| 4,690,722 | 9/1987 | Flood | 156/73.1 X |
| 4,859,378 | 8/1989 | Wolcott | 156/73.1 X |
| 4,973,876 | 11/1990 | Roberts | 310/316 |
| 5,435,863 | 7/1995 | Frantz | 156/64 |
| 5,487,802 | 1/1996 | Mizuta et al. | 156/73.1 |
| 5,658,408 | 8/1997 | Frantz et al. | 156/64 |
| 5,772,814 | 6/1998 | Grewell | 156/64 |

FOREIGN PATENT DOCUMENTS

| | | |
|---|---|---|
| 0421019 | 10/1989 | European Pat. Off. . |
| 2302172 | 2/1975 | France . |
| 2161023 | 12/1970 | Germany . |
| 2361829 | 6/1974 | Germany . |
| 3130128 | 4/1982 | Germany . |
| 3313918 | 10/1983 | Germany . |
| 3723333 | 1/1989 | Germany . |
| 281038 | 7/1990 | Germany . |
| 4206584 | 3/1994 | Germany . |
| 4317621 | 6/1994 | Germany . |
| 1030367 | 2/1986 | Japan . |
| 2168208 | 7/1987 | Japan . |
| 903161 | 2/1982 | Russian Federation . |

OTHER PUBLICATIONS

Kunstoffe 76 (1986) pp. 891–896, article by W. Ochs, et al. entitled "Mikrocomputergesteuerte Ultraschallschweissmaschine" (1986)—no translation.

Kunstoffe 83 (1993) pp. 667–670 entitled "Bessere Nahtqualitat beim Ultraschallschweissen" (1993) with translation.

Antech—94, paper entitled "Amplitude Control in Ultrasonic Welding of Thermoplastics" by David A. Grewell and Jeffrey L. Frantz, (1994).

*Primary Examiner*—James Sells
*Attorney, Agent, or Firm*—Polster, Lieder, Woodruff & Lucchesi, LC

[57] ABSTRACT

An ultrasonic processing method is disclosed wherein during the processing time interval the motional amplitude and engaging force of the resonating horn and thereby the power and engaging pressure to the workpiece is varied to improve weld strength and decrease weld cycle time. The variation in motional amplitude and engaging force may be in response to a process condition such as a change in dimensions of the workpiece, a sharp rise in the transducer power curve, or in response to the lapse of a predetermined time interval.

22 Claims, 6 Drawing Sheets

POLYMER ORIENTATION IN WELD LINE (PC)

SCHEMATIC OF ULTRASONIC WELDING PROCESS

PLOT OF WELD STRENGTH AS FUNCTION OF WELD FORCE

PLOT OF WELD TIME AS FUNCTION OF WELD FORCE

MICROGRAPH OF NYLON JOINT AREA MADE
WITH AND WITHOUT FORCE PROFILING

COMPARISON OF WELDS MADE WITH AND WITHOUT
FORCE PROFILING (CONSTANT COLLAPSE=0.48mm)

TYPICAL CYCLE GRAPH OF WELD MADE WITH
AMPLITUDE AND FORCE PROFILING (ABS)

DETAILS OF AWS SAMPLE

COMPARISON OF WELDS MADE WITH AND WITHOUT
AMPLITUDE AND FORCE PROFILING (CONSTANT COLLAPSE=0.48mm)

SIMULTANEOUS AMPLITUDE AND FORCE PROFILING DURING ULTRASONIC WELDING OF THERMOPLASTIC WORKPIECES

CROSS-REFERENCE TO A RELATED APPLICATIONS

This is a continuation-in-part application of U.S. patent application Ser. No. 08/506,104 filed Jul. 24, 1995, now U.S. Pat. No. 5,658,408, which is a continuation-in-part of U.S. patent application Ser. No. 08/221,047, filed Mar. 31, 1994, now U.S. Pat. No. 5,435,863, which is a continuation-in-part of U.S. patent application Ser. No. 07/871,692, filed Apr. 21, 1992, now abandoned.

STATEMENT REGARDING FEDERALLY SPONSORED RESEARCH OR DEVELOPMENT

Not applicable.

BACKGROUND OF THE INVENTION

This invention concerns a method for processing workpieces by ultrasonic energy and, more specifically, refers to a method for processing thermoplastic workpieces using vibratory energy in the ultrasonic frequency range for bonding, sealing, or welding thermoplastic film and fabric materials as well as substantially rigid workpieces. Quite specifically, this invention concerns a method wherein the motional amplitudes and engaging forces of the ultrasonic transducer horn in contact with the workpiece are varied over particular profiles during the weld cycle, thereby varying the power transmitted from the horn to the workpiece and the engaging force during such cycle.

Ultrasonic welding is one of the most common techniques for joining thermoplastic sub-assemblies. Its primary advantages are its short cycle times and moderate capital costs. Typical manual cycle production times are less than three to five seconds, resulting in production rates above 500 units per hour. The traditional techniques of welding thermoplastic workpieces and plunge sealing film and fabric materials by ultrasonic energy are well known. The techniques work by applying relatively high stresses to the parts being joined to induce hysterisis heating at the bond line. During a weld cycle, the workpieces are supported on an anvil. A horn, dimensioned to be resonant, preferably as a one-half wavelength resonator or multiples thereof, for high frequency vibrations of predetermined frequency traveling longitudinally therethrough, is brought into forced engagement with the workpiece for the duration of the weld cycle, and responsive to the horn being rendered resonant, ultrasonic energy is transmitted to the workpieces, for causing a softening and flowing of the thermoplastic material.

Generally it is recognized that the ultrasonic energy or power transmitted to the workpiece is dependent on three factors, namely, the frequency of the electroacoustic transducer, the engaging force or clamping pressures applied to the workpiece by the horn, and the motional amplitude of the horn as it transmits the energy to the workpieces. It will be appreciated that, in general, in an ultrasonic welding machine, the frequency of the electroacoustic transducer is relatively constant, preferably within the range of 20–40 KHz. Similarly, in the past, it has been the common practice to retain the motional amplitude of the horn, i.e., the peak-to-peak mechanical excursion of the frontal horn surface in contact with the workpieces (measured in microns, and herein designated as "$\mu m_{pp}$"), constant during the entire weld cycle.

In the welding of rigid thermoplastic components, the ultrasonic energy transmitted to the weld surfaces from the horn propagates through the upper workpiece, and is concentrated at the weld surfaces by means of an "energy director," as described in the coassigned U.S. Pat. No. 4,618,516. The energy director is a molded-in stress concentrator which locally deforms under the motional force and stress induced by the ultrasonic energy. The local deformation of the energy director initiates heating and melting from the hysterisis losses of the thermoplastic. The average heating rate ($Q_{avg}$) of the energy director is governed by the general equation:

$$Q_{avg} = \frac{\omega \epsilon_o^2 E''}{2}$$

where $\epsilon_O$ is the strain, which is proportional to amplitude; $\omega$ is the frequency; and E" is the complex loss modulus.

Once melting occurs, the molten energy director flows across the surface to be joined, forming a weld bead. The rate of flow is determined by a number of variables, but is primarily effected by the temperature of the melt and the engaging force applied to the parts. After the application of ultrasonic energy is discontinued, the melt solidifies under a continued engaging force to form a fused joint, thereby establishing a bond or weld between the workpieces. It can be seen in the average heating rate equation set forth above that the heating is proportional to the square of the applied strain, which is in turn proportional to the vibrational amplitude of the horn face. Thus, the bond line heating can be controlled by varying the motional amplitude. At higher amplitudes, the average bond line heating rate is higher, which in turn causes the temperature to rise to higher levels, resulting in the melt having a higher flow rate. High flows rates lead to a high degree of molecular alignment, but this alignment is orthogonal to the desired loading stress on the workpieces, and can result in fractures initiated at any discontinuities in the weld. An additional effect of high flow rates is significant flash, which is undesirable as a cosmetic consideration. On the other extreme, insufficiently high motional amplitude can result in a non-uniform melt initiation and/or premature solidification of the melt due to inadequate heating.

Similarly, it is seen that the strength of the resulting weld is generally inversely proportional to the engaging force. A higher engaging force promotes a high degree of molecular alignment within in the melt by forcing the molten material to flow and solidify under the higher pressures. This results in a weaker weld upon solidification, subject to fractures as described above. The level of the engaging force additionally is seen to effect the time required to complete the weld cycle. At the higher engaging forces, the melted material flows more rapidly, and is reduced to a thinner layer, allowing for a more rapid solidification. Lower engaging forces permit the melt to form a thicker layer, and decrease the flow rate. Accordingly, the weld cycle time is proportional to the engaging force.

Conventional methods of ultrasonic welding do not permit the simultaneous control and variation of the motional amplitude and engaging force during the weld cycle. Rather, it has been common practice to maintain the motional amplitude of the horn, i.e. the peak-to-peak mechanical excursion of the frontal horn surface in contact with the workpiece, constant at a rate sufficient to produce the desired flow rate in the molten material during the entire time interval of ultrasonic power transfer to the workpiece. Similarly, most welding systems are pneumatically driven by standard pressure regulators which hold the engaging force between the frontal horn surface and the workpiece relatively constant during the weld cycle. However, during an ultrasonic thermoplastic welding cycle, the workpieces transition through several different phases, each of which may benefit from different motional amplitudes and engaging forces to decrease weld cycle time and increase the quality of the weld in terms of strength, consistency, and cosmetics. Accordingly, the present invention discloses a method in which both the motional amplitude of the horn and the engaging force are varied during the weld cycle in response to a control signal which may be responsive, for instance, to a change in the power transmitted from the horn to the workpiece, a process related change of the workpiece dimensions, a process related timing signal, or some other process related parameter.

The invention, which will be described in detail hereinafter, has been made possible by the development of a method of varying motional amplitude during ultrasonic welding disclosed in U.S. Pat. No. 5,434,863 issued to J. L. Frantz, dated Jul. 25, 1995, entitled "Method for Processing Workpieces by Ultrasonic Energy", which patent is specifically incorporated herein for reference. This method describes the process of reducing motional amplitude of the horn during a weld cycle, thereby varying the power delivered to the workpieces and producing a stronger weld.

BRIEF SUMMARY OF THE INVENTION

Among the several objects and advantages of the present invention include:

The provision of a new and improved method for welding thermoplastic workpieces by ultrasonic energy in which the motional amplitude and horn engaging force are varied during the weld cycle;

The provision of the aforementioned method for ultrasonic welding which includes varying the motional amplitude and engaging force applied to a workpiece over the weld cycle in accordance with predetermined profiles or in response to process related control signals;

The provision of the aforementioned method for ultrasonic welding in which the motional amplitude of the horn and the engaging force are increased for the initial portion of the weld cycle so as to accelerate the preheating and melting of workpieces in the region of the weld line to be formed, and then, after this initial portion of the weld cycle, gradually decreased to complete the weld formation;

The provision of the aforementioned method for ultrasonic welding in which full control of bond line temperature and squeeze flow of the melt within the weld is provided by simultaneous variation of the motional amplitude and engaging force of the horn;

The provision of the aforementioned method for ultrasonic welding which includes an increase in the strength of the resulting weld;

The provision of the aforementioned method for ultrasonic welding which includes a reduction in residual stress remaining within the weld;

The provision of the aforementioned method for ultrasonic welding which includes an increased solvent resistance of the resulting weld;

The provision of the aforementioned method for ultrasonic welding which includes a decrease in the required weld cycle time interval;

The provision of the aforementioned method for ultrasonic welding which includes an increase in the randomized molecular alignment of the polymer chains within the resulting welds, increasing weld strength;

The provision of the aforementioned method for ultrasonic welding which maintains the molecular weight of the welded thermoplastic;

The provision of the aforementioned method for ultrasonic welding which includes an improved cosmetic appearance in the resulting welds; and The provision of the aforementioned method for ultrasonic welding which provides an easier setup and more robust welding process.

Briefly stated, the motional amplitude and engaging force profiling method of the present invention is primarily intended to improve the ultrasonic welding of thermoplastic workpieces. The improved ultrasonic welding is accomplished by simultaneously varying the motional amplitude and applied engaging forces to correspond to the ideal conditions for each stage of the welding cycle, resulting in increased weld strength, improved weld characteristics, and reduced weld cycle time. The increased weld strength results from reduced orthogonal molecular alignment, and the reduced weld cycle time results from the use of large engaging forces during the initial portion of the weld cycle. Accordingly, a relatively high amplitude and engaging force is applied to the thermoplastic workpieces to start the weld process quickly, and a relatively low amplitude and weld force is used to complete the weld with minimal molecular alignment. The end result is a decreased weld cycle time and an increase in weld strength with accompanying improvements in cosmetic appearances and weld reliability.

The foregoing and other objects, features, and advantages of the invention as well as presently preferred method thereof will become more apparent from the reading of the following description in connection with the accompanying drawings.

BRIEF DESCRIPTION OF THE SEVERAL VIEWS OF THE DRAWINGS

In the drawings.

Corresponding reference characters indicate corresponding parts throughout the several views of the drawings.

DETAILED DESCRIPTION OF THE INVENTION

The following detailed description illustrates the invention by way of example and not by way of limitation. The description will clearly enable one skilled in the art to perform and use the invention, describes several adaptations, variations, alternatives, and uses of the invention, including what we presently believe is the best mode of carrying out the invention.

Figure 1:
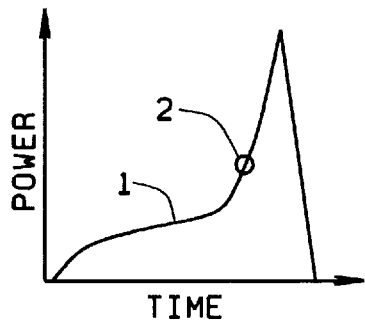
FIG. 1 is a graph depicting power vs. time in a typical ultrasonic cut and seal operation.

Referring now to the drawings and FIG. 1 in particular, there is shown a graph of power applied from the horn of an ultrasonic welder to the workpiece in a typical plunge type ultrasonic seal and cut operation, wherein two thermoplastic film or fabric materials, superposed upon one another, are disposed on a metal anvil, and a horn is brought into forced contact with the exposed workpiece surface to simultaneously cut through the two layers, separating them from the surrounding stock material, and welding the two layers of material along the cut edge. A typical example is the manufacture of a circular filter pad. Upon the horn contacting the workpiece with a predetermined engaging force, the horn is rendered resonant and ultrasonic energy is coupled to the workpiece, thus starting a time interval (also known as the weld cycle time interval or the cut and seal cycle time), as shown by curve 1. After some passage of time during the time interval, the horn cuts through the workpiece establishing direct metal-to-metal contact with the metal anvil. Prior to this point during the weld cycle time interval, as indicated at point 2 in FIG. 1, the power flow rises rapidly as a result of the lower acoustic impedance of the melt. The power continues to rise sharply until the end of the weld cycle time interval, generally a preset (or predetermined) time interval. However, the end of the weld cycle may be determined in response to a weld related parameter, as hereinafter described.

In production, the repetitive high frequency impact of the horn in direct metal-to-metal contact with the anvil, which occurs with a force of several thousand gravities, and the somewhat scrubbing motion of the vibrating horn causes a relatively rapid wear of the impacting anvil and horn surfaces. This oftentimes necessitates the early refinishing of the surfaces or replacement of the horn and anvil. In typical instances, the front surface of the horn becomes grooved and the knife-shaped cutting surface of the anvil becomes dull thus adversely affecting the ability of the ultrasonic welder to carry out its intended welding functions.

Figure 2:
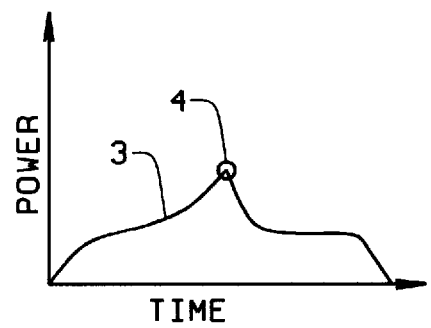
FIG. 2 is a graph similar to FIG. 1, but reducing the motional amplitude of the horn when the power attains a predetermined level.

FIG. 2 shows the improved arrangement of varying the motional amplitude of the horn during the weld cycle. In response to the rise of the power transfer, as shown by the portion of the power vs. time curve indicated by numeral 3 starting at the origin and continuing to point 4 which corresponds to the formation of the melt, a control signal is produced which, in turn, causes a reduction of the motional amplitude for the remainder of the cut and seal cycle. Thus, the power provided for the remainder of the cut and seal cycle is limited. The reduction of power has effected a dramatic reduction of the mechanical wear apparent at the frontal surface of the horn and at the raised anvil cutting surface.

Figure 3:
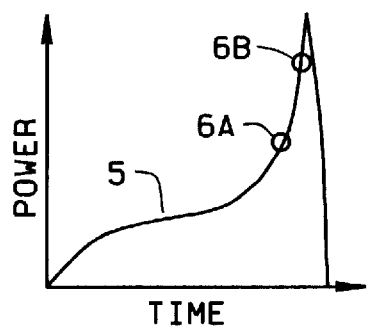
FIG. 3 is a graph similar to FIG. 1 when producing a filter comprising two superposed non-woven thermoplastic materials.

FIG. 3 depicts a graph of power vs. time when welding two superposed layers of non-woven thermoplastic material for producing a filter. The portion 5 of the curve from the origin to the point 6A is similar to the portion of the curve in FIG. 1 from the origin to point 2. As the filter material melts, there is evident a short period of time during the weld cycle (this short period of time being referred to as a window) between the time a good bond condition may be effected, as indicated at 6A, and the time an overwelded condition is effected, as indicated at 6B. The power curve 5 of prior art welding apparatus and methods provides a very narrow time window (between points 6A and 6B) for achieving a good product. The method of the present invention greatly lengthens the window during the predetermined weld cycle during which a good bond condition may be achieved. In addition, the method of this invention permits a wider range of weld parameters and yet will result in good bond condition welds which are much more repeatable in actual production conditions.

Figure 4:
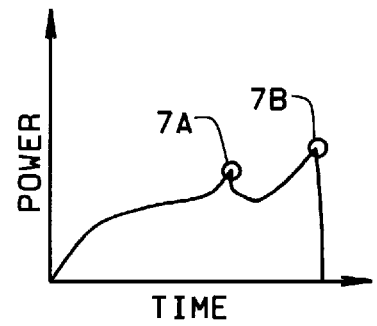
FIG. 4 is a graph of power vs. time when the power level is reduced during the time interval of producing a filter.

FIG. 4 shows the condition wherein by reducing the motional amplitude of the horn, as indicated at 7A, at the time the power would normally increase sharply due to the material having reached a melted condition, the time window, as indicated by the change in time between points 7A and 7B, available for producing a good product is widened considerably. It will be apparent that once the material has reached its melted state, there is no need for increasing power. A relatively low power level will suffice to complete the weld cycle. Additionally, providing a wider time window in which good welds may be made allows wider tolerances for many of the weld parameters (including weld power, material thickness and other variations, horn characteristics and other variables).

Figure 5:
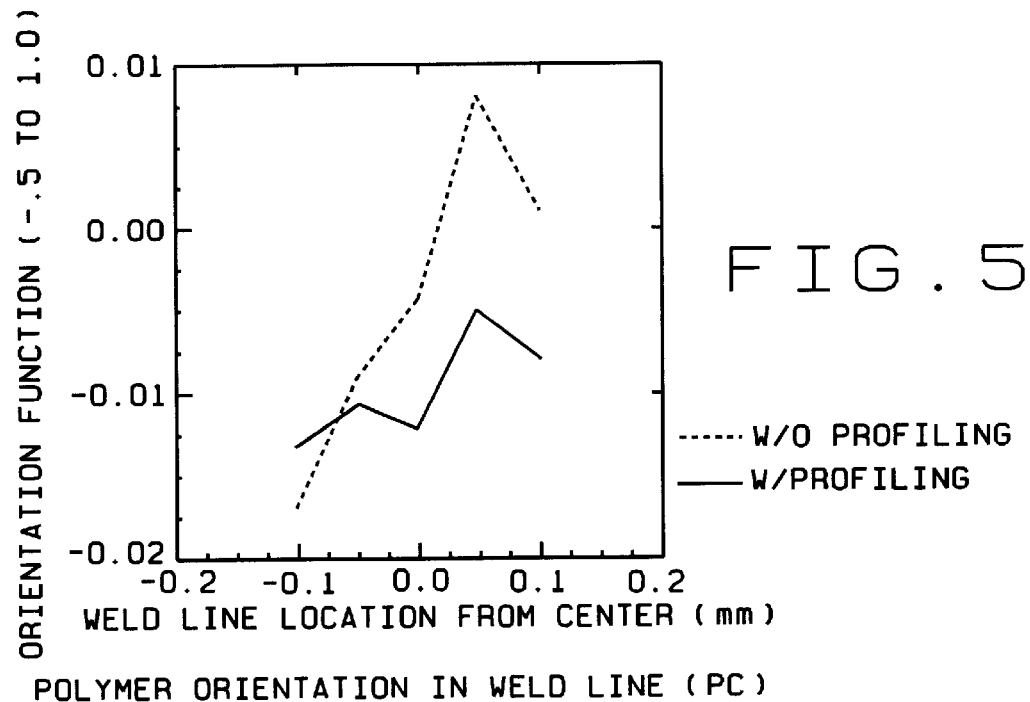
FIG. 5 is a graphical comparison of weld molecular orientation resulting from traditional ultrasonic welding methods and from the welding method of the present invention.

Varying or profiling the motional amplitude of the transducer horn 20 during the course of a weld cycle increases the strength of the resulting weld by reducing the levels of residual stress and by altering the alignment of the molecular chains of thermoplastic. Referring to FIG. 5, there is shown a graph of the molecular orientation for the polymer chains contained within a welded thermoplastic component produced by both traditional and amplitude profiled ultrasonic welding. The Y-axis indicated the orientation function. A value of 1.0 indicates that all the polymer chains are perfectly aligned in the direction of the weld (parallel to the surfaces welded). A value of −0.5 indicates that all the polymer chains are perpendicular to the weld direction. The weld line distance shown on the X-axis indicates the distance from the weld-center-line where the measurement was taken. As can be seen in FIG. 5, most of the chains are randomly orientated (indicated by an orientation function= 0). However, in the weld made without amplitude profiling, the polymer chains are slightly more orientated in the direction of the squeeze flow, which results in a weaker structure when loaded in tensile. If a weld is loaded in pure tension as opposed to pure tensile, a perfect perpendicular alignment of the polymer chains would provide for the maximum possible weld strength, as the load would be carried primarily by the bonds. Most loads, however, are not pure tension loads.

Figure 6:
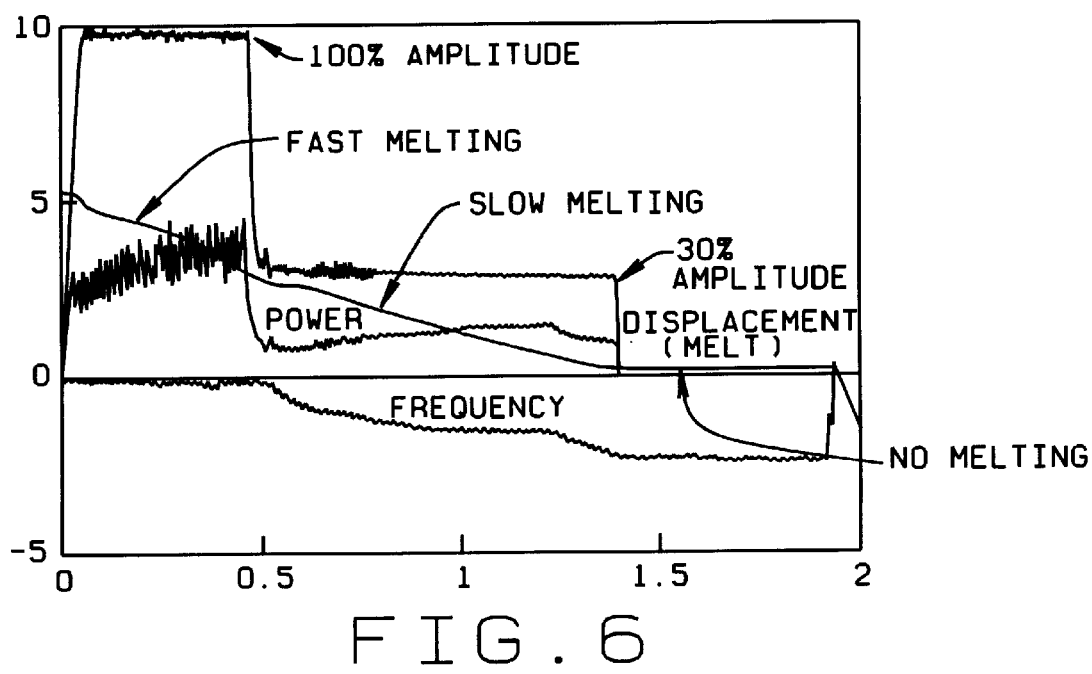
FIG. 6 is a graphical representation of motional amplitude, displacement, power, and frequency of an ultrasonic welder during an adjusted motional amplitude welding cycle.
Figure 7:
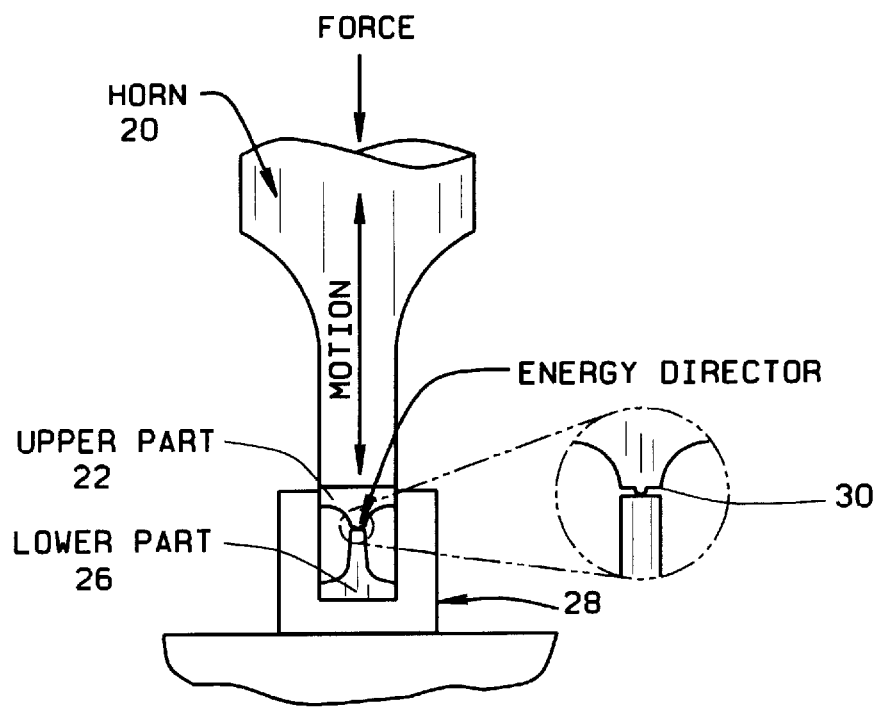
FIG. 7 is an illustration of the ultrasonic welding process as applied to rigid thermoplastic workpieces.

Referring to FIGS. 6 and 7, there is shown a graph of one method of amplitude profiling applied to traditional thermoplastic components. Initially, the ultrasonic transducer horn 20 is placed at a predetermined engaging force against the upper component 22 of workpiece 24, and resonated at an ultrasonic frequency to produce maximum motional amplitude (100% amplitude). The lower component 26 of workpiece 24 is supported by the anvil 28. At the point of intersection between the upper and lower components 22, 26 a small projection, or energy director 30 may be provided, shown here on the upper component 22. The energy director 30 melts and collapses in response to the input of ultrasonic energy into the system from the transducer horn 20. Once the energy director 30 is mostly melted, the motional amplitude is reduced, as shown in FIG. 6 by a downward transition to a lower amplitude (30% amplitude) sufficient to complete the melting process. Prior art ultrasonic welding techniques do not reduce or vary the motional amplitude, but continue to apply the maximum motional amplitude until the weld cycle is completed.

Once melted, molten material from the energy director 30 flows to fills the gap between the upper and lower components 22, 26 and any optionally provided recesses in the other part, as shown for instance in U.S. Pat. No. 4,618,516 dated Nov. 21, 1986, issued to T. B. Sager, entitled "Ultrasonic Welding of Thermoplastic Workpieces." Upon completion of the melting process, the delivery of ultrasonic energy to the workpiece 24 is ceased, and the molten material solidifies under pressure from the continued engaging force. As is shown in FIG. 5, the resulting molecular orientation of the polymer chains produced by the amplitude profiling process is less orientated in the melt flow direction, resulting in stronger bonds when loaded in tensile. Similarly the levels of residual stress within the weld are reduced by as much as 30%, adding to the strength of the bonds. The variation in motional amplitude with the consequently lowered heating rate additionally reduces the presence of visible flash and of voids in the weld without any resulting loss of molecular weight. Weld voids result from cavitation in the melted material, and their existence weakens the weld.

Figure 8:
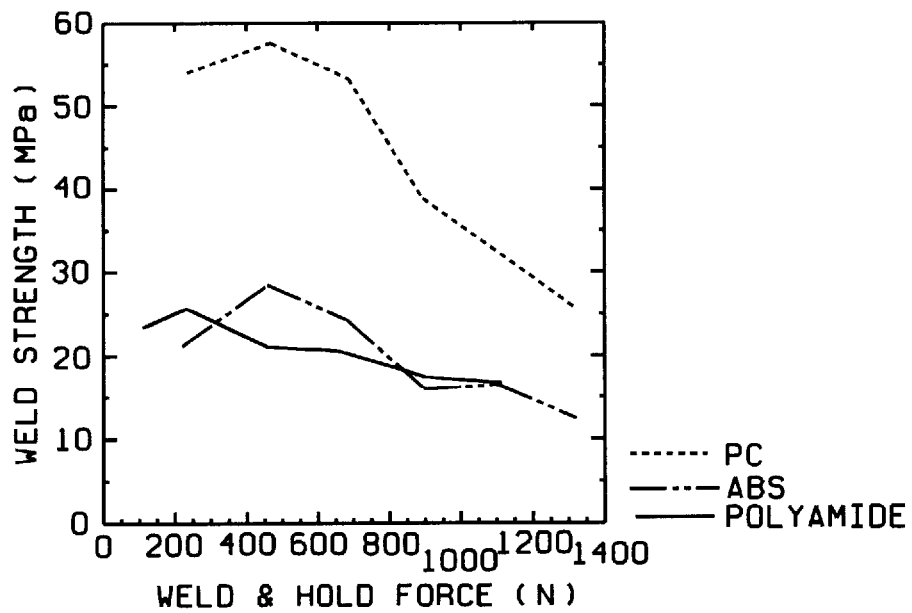
FIG. 8 is a graphical representation of weld strength as a function of applied weld force for different types of thermoplastics.

The strength of a weld is additionally proportional to the engaging force applied by the transducer horn 20. FIG. 8 is a graph of ultrasonic weld strength for different types of thermoplastics as a function of the applied engaging force. It is seen that the weld strength is generally inversely proportional to the engaging force applied. This is due in part to the higher engaging forces promoting the development of undesired molecular alignment of the polymer chains by restricting the molten material flow.

Figure 9:
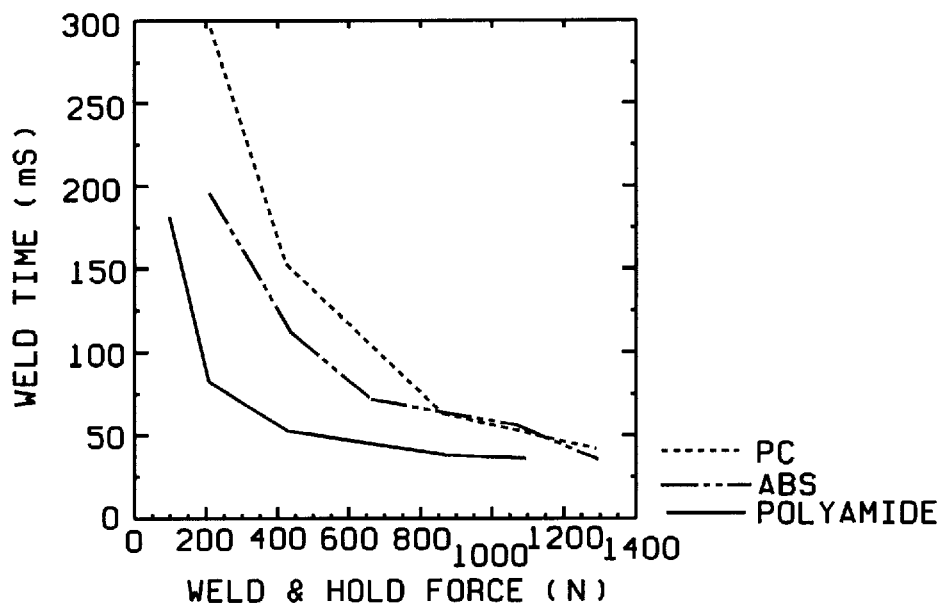
FIG. 9 is a graphical representation of weld cycle times as a function of applied weld force for different types of thermoplastics.

Similarly, FIG. 9 illustrates a proportional relationship between the time required to complete a weld for different types of thermoplastic materials and the engaging force. As can be clearly seen, the greater the engaging force applied to the workpiece 24 by the transducer horn 20, the faster the weld cycle may be completed. Thus, from a manufacturing perspective, higher engaging forces result in the highest production rates, but with less quality and strength in the welded components produced.

Figure 10:
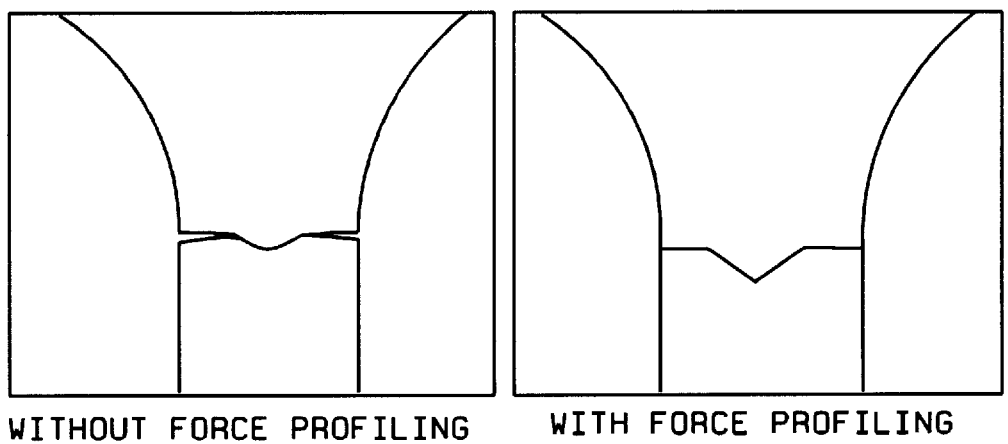
FIG. 10 is a micrograph comparison of welds resulting from traditional ultrasonic welding methods and from welding methods employing force profiling.
Figure 11:
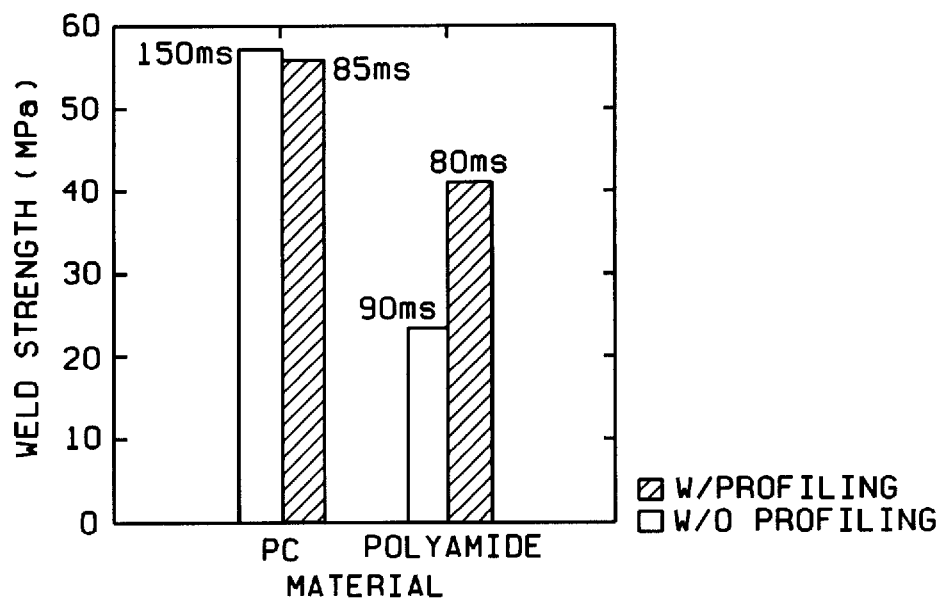
FIG. 11 is a graphical comparison of welds in different thermoplastic workpieces resulting from traditional ultrasonic welding methods and from welding methods employing force profiling.

Micrographs, as shown in FIG. 10, of the weld zone reveal that an increase in weld area resulting from the energy director 30 being driven into the lower component 24 during the initial application of a high engaging force during the welding cycle results in an increase in weld strength. Accordingly, as seen in FIG. 11, the application of force profiling to vary the amount of engaging force applied to the workpiece over the weld cycle results in an increase in weld strength and a decrease in weld times as compared to the traditional full motional amplitude, full engaging force approach.

Figure 12:
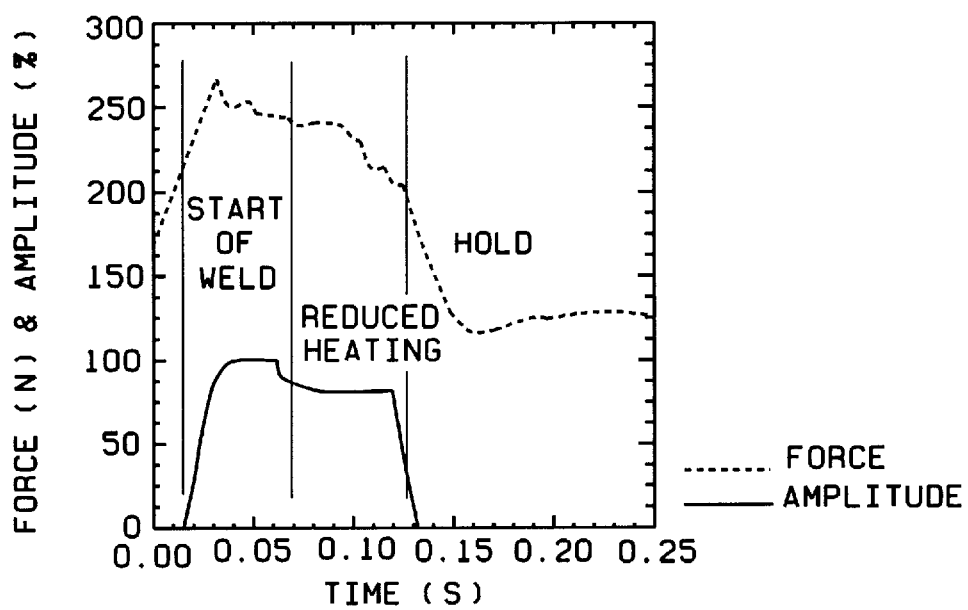
FIG. 12 is a graphical representation of motional amplitude, applied welding force, and welding stages of an ultrasonic welder carrying out the welding method of the present invention.

In accordance with the present invention, the motional amplitude and engaging force of the ultrasonic transducer horn 20 are varied over the weld cycle, as illustrated in FIG. 12. Initially, the ultrasonic transducer horn 20 is engaged in forced contact with the workpiece 24 with a rapidly increasing engaging force. Applying an initially increasing engaging force results in a rapid initial melting, and drives the energy director 30 into the lower component of the workpiece 24, increasing the surface area of the weld.

It has additionally been found that if an energy director, such as the above-described energy director 30 shown in FIG. 7, is pre-heated during the weld cycle, as by gradually heating the energy director 30 during the initial phase of the weld cycle, the tendency of the energy director 30 to shatter or break and to thus form splatter particles during the initial portion of the weld cycle is minimized. This results in a cleaner weld joint. Further, it has been found that this more gradual heating of the energy director (i.e., through motional amplitude profiling) during the weld cycle also results in the formation of less flash as described above which in turn eliminates crevices along the weld in which contaminants may collect. Again, this also results in an cleaner weld.

More specifically, in accordance with the method of the present invention, upon initiation of the weld cycle, the motional amplitude of the ultrasonic horn is gradually increased (i.e., ramped up) from a relatively low power level or motional amplitude to a higher motional amplitude (e.g., from about 5% to about 80% (and more preferably from about 10% to about 40%) of its full motional amplitude) over the initial portion (e.g., about the first 250 milliseconds) of the weld cycle such that relatively low ultrasonic energy is applied to the part and particularly to the energy director 30. Such a motional amplitude weld cycle profile is illustrated in the first portion of FIG. 12. It will be understood that the above examples of the range of motional amplitudes for the initial preheating period and the initial time for the preheating period may, in accordance with this invention, vary widely, depending the size of the workpieces, the resin from which the workpieces are formed, the length of the weld line, the power of the ultrasonic welder, and many other factors.

As previously noted, it has been found that this more gradual application of power to the energy director over this initial period of time allows the energy director to soften and/or to at least partially melt rather than to shatter thus significantly reducing the formation of particles during the weld cycle. In fact, testing (as described in detail below) has shown that by slowly heating the energy director, up to about an 81% reduction of particulates may be achieved which in turn results in the formation of a weld with substantially fewer particles which may contaminate the weld or a product to be contained within a container formed by the workpieces.

In some applications when the parts to be welded are of crystalline structure (e.g., such thermoplastic resins as nylon, nylon 66, acetal, polypropylene, polyethylene, and thermoplastic polyester) with energy directors, the weld has areas where melting does not occur and where the energy director is mechanically collapsed instead of melted. The cause of this phenomena is not yet fully understood, but is believed to be due to non-uniform heating due to residual stresses and/or modes of vibration of the parts. The non-uniform heating is then compounded by a relatively sharp transition of melting. Once portions of the energy director melt and flow, the remaining portions must support the clamp loads from the welding horn and the welding machine and these portions collapse and deform thus forming so-called "dead spots" within the weld which make it nearly impossible to promote uniform melting and fusion. It has been found by using relatively high amplitude, for example 100 $\mu m_{pp}$, melting occurs so rapidly that the energy director does not collapse and the "dead-spots" are not seen. However, it has been found that it is not always possible to employ such high amplitude during the weld cycle because of a variety of reasons. In accordance with the method of motional amplitude and engaging force profiling of the present invention, we have found that by preheating the energy director with a more moderate amplitude (e.g., 58 $\mu m_{pp}$), these dead spots can be reduced. It is believed that by preheating the energy director, more uniform heating of the material in the weld zone is promoted.

Upon completion of the initial increase in the engaging force and preheating motional amplitude, ultrasonic energy is transmitted through the transducer horn 20 to the workpieces 24 during a first portion of the weld cycle at full motional amplitude and maximum engaging force so as to heat, melt, and compress the interface between the upper component 22, lower component 26, and the energy director 30. After the initial softening and flowing of thermoplastic material has occurred, as may be determined by sensing when the energy director has partially melted or which may be determined by the passage of a preset portion of the time interval (weld cycle), the motional amplitude (power) of the transducer horn 20 necessary to complete the weld cycle is reduced to a second (lower) motional amplitude. Simultaneously, the engaging force applied by the transducer horn 20 is reduced to a lower level sufficient to maintain the workpiece components 22 and 26 in contact with the flow of the melted thermoplastic material. Finally, during a holding phase, the motional amplitude is reduced to zero, terminating the ultrasonic energy transmitted through the transducer horn 20, and the engaging force is reduced further during the time interval required for the melted thermoplastic to solidify, completing the weld. The result is a process which produces welds more easily and repeatably, which gives a wider degree of process tolerances, which reduced the overall weld cycle time, and which produces stronger welds than the prior art ultrasonic welding processes.

The control signal for effecting the variations of the motional amplitude and engaging force can be responsive to the value of the power provided to the workpiece as illustrated heretofore, or can be responsive to other parameters of the process. For example, a control signal can be produced in response to a predetermined amount of time elapsed in the weld cycle. Other control signals can be produced in response to a changing mechanical dimension of the workpiece assembly as sensed, for instance, by mechanical sensing means, optical sensing means, or an eddy current sensing device, see U.S. Pat. No. 4,631,685 dated Dec. 23, 1986 issued to D. A. Peter, entitled "Method and Apparatus for Ultrasonic Plastic Forming and Joining". Therefore, in a typical application, the variation of power transmitted and engaging force applied by the horn may be effected when, for example, fifty percent (50%) of the collapse of the energy director is sensed or has been established experimentally. In the latter case, the control signal can be responsive to time elapsed in the weld cycle.

As will be apparent to those skilled in the art, the variation of the motional amplitude of the transducer horn 20 and the engaging force does not need to occur abruptly or in step transitions. A varying or dynamic control signal may be provided, produced for instance by a function generator which is triggered upon the start of the weld cycle. In this manner, a continually varying motional amplitude and engaging force profile can be achieved. The latter arrangement is particularly useful for adjusting to the composition of different thermoplastic materials.

It will additionally be appreciated by those skilled in the art that the actual weld cycle time over which the motional amplitude and engaging force are profiled may vary drastically from that shown in FIG. 9 depending upon the materials from which the two parts to be welded are fabricated, the thickness of the width and length of the weld, and many other parameters. Similarly, the optimum profiles for the motional amplitude and engaging force for any combination of workpieces will be dependent upon the above noted factors.

TEST RESULTS

Figure 13:
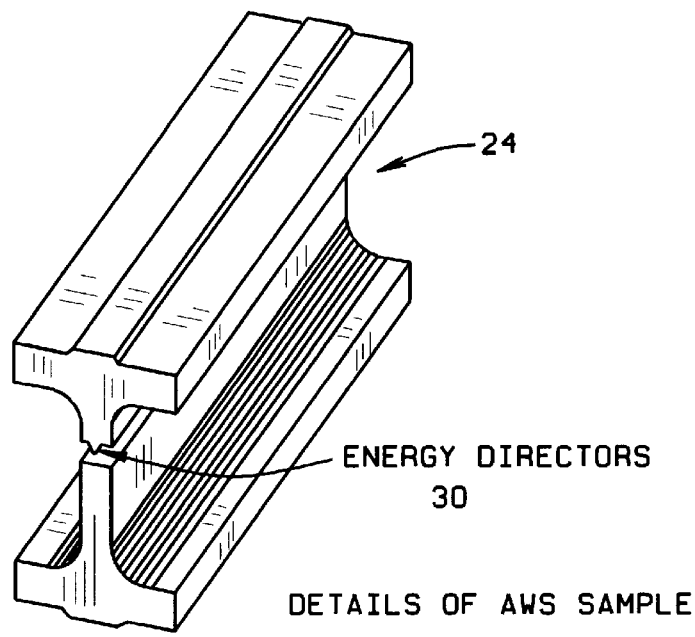
FIG. 13 is a perspective view of standard weld test specimens utilized in the test results hereinafter described.

Tests were conducted to determine the effect of profiling both the motional amplitude and applied welding force on the strength of welds using an ultrasonic welding apparatus. The tests utilized an ultrasonic welder commercially available from Branson Ultrasonics Corporation of Danbury, Conn. (Model 920MA, Branson 900 series AES actuator fitted with a voltage controlled proportional pressure regulator). The test specimens were the proposed American Welding Society (AWS) samples, as shown in FIG. 13, of three different thermoplastic materials: ABS (acrylonitril-butadiene-styrene), polycarbonate (PC), and polyamide. The motional amplitude and engaging force was controlled by a specialized D/A plug-in board in an IBM-based personal computer. The D/A plug-in board allowed the motional amplitude and engaging force to be varied at multiple levels during the weld cycle, permitting the selection of proper engaging force and motional amplitude for each phase of the weld cycle. The average force change rate as 9186 N/S. The resulting weld samples were tested in tension using a Tinius Olsen Tensile Tester 5000 (22,241 N Load Cell with a 50% range setting), with a cross head speed was 0.003 mm/S. The highest load supported by the sample was recorded. Most samples failed in fracture; however, some yielded prior to fracture.

To determine the benefits of simultaneous motional amplitude and engaging force profiling, samples were welded with a cycle time resulting in a collapse or displacement of 0.48 mm. Experiments prepared welds with various constant weld and hold forces at various amplitudes (50 to 125 $\mu m_{pp}$); with varying weld and hold forces (220 to 1334 N) at various amplitudes (50 to 125 $\mu m_{pp}$); and evaluated the effect of engaging force and amplitude profiling on weld strength and weld time against welds made without profiling. Samples welded with and without motional amplitude profiling were tested to measure residuals stresses in the bond line using a solvent test, with results as follows:

| Welds | Time | Weld Force | Collapse | Amplitude | Residual Stress |
|---|---|---|---|---|---|
| W/Profiling | 782 mS | 334 N | 0.66 mm | 16→77.6 $\mu m_{pp}$ @ 110 mS | 12.1 MPa |
| W/O Profiling | 244 mS | 334 N | 0.66 mm | 77.6 $\mu m_{pp}$ | 16.2 MPa |

Similarly, PC samples welded with and without motional amplitude profiling were tested to determine if there was a reduction in molecular weight of the welded material.

| SAMPLE | DESCRIPTION | MOLECULAR WEIGHT (g/mole) |
|--------|-------------|---------------------------|
| #1 | Un-Welded | 28080 |
| #2 | High Motional Amplitude | 29120 |
| #3 | Low Motional Amplitude | 28470 |
| #4 | High to Low Amplitude | 28440 |

Although there appears to be a slight increase in the molecular weight of the samples, indicative of further polymerization or cross linking, it is believed to be an artifact of the measuring technique used, which has an accuracy of ±1000 g/mole. Furthermore, the chemistry of PC does not suggest that cross-linking will occur during a weld cycle.

Figure 14:
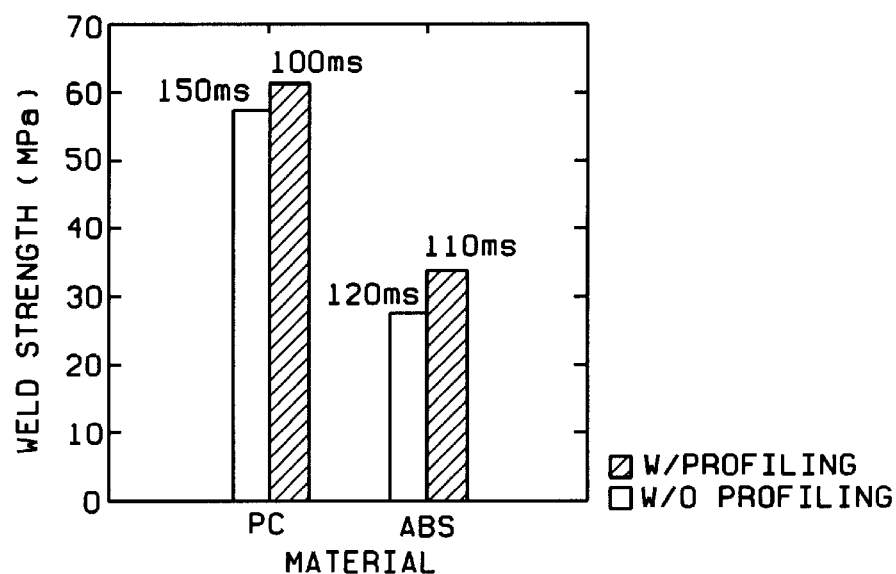
FIG. 14 is a graphical comparison of welds in different thermoplastic workpieces resulting from traditional ultrasonic welding methods and from the welding method of the present invention as described hereinafter.

FIG. 14 shows the results of comparison testing simultaneous profiling of motional amplitude and engaging force on PC and ABS samples. The benefits from the combined amplitude and force profiling of the present invention can be seen compared to welds made without any profiling; increased strength and decreased weld time. The increased strength results from the reduced molecular alignment, and the reduced cycle time is a result of employing an initially high welding force. Thus, a relatively high amplitude and welding force is used to start the weld quickly, and a relatively low amplitude and welding force is use to complete the weld with minimal molecular alignment.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. The method of obtaining improved weld strength and reduced weld cycle time between two or more thermoplastic parts which are to be joined along a common interface surface and wherein a horn rendered resonant at an ultrasonic frequency during said weld cycle time applies engaging force and ultrasonic energy to said parts contacting one another along said interface surface, the improvement comprising:

rendering the horn resonance at a first motional amplitude during a first portion of said weld cycle time;

applying said engaging force at a first level during a first portion of said weld cycle time; and after the lapse of a predetermined time in said weld cycle time, reducing said engaging force and rendering said horn resonant at a second motional amplitude during the remainder of the weld cycle time thereby to strengthen said weld and reduce said weld cycle time.

2. The method of claim 1 wherein said second motional amplitude is lower than said first motional amplitude.

3. An ultrasonic energy processing method for welding two substantially rigid thermoplastic parts together, said parts being stacked one on one another with the upper of said parts being engaged by a horn adapted for transmitting ultrasonic energy to said stacked parts for a predetermined time interval, said stacked parts being supported on a suitable anvil or the like, each of said parts having a surface to be joined to the other of said parts, and said surface of one of said parts having an energy director thereon, said method comprising the steps of:

energizing said ultrasonic horn during a first portion of said predetermined time interval at a first motional amplitude so as to heat said energy director and said surfaces of said parts at a first heating rate;

engaging said ultrasonic horn with said stacked parts with first engaging force sufficient to compress said energy director and maintain contact between said horn and said stacked parts;

generating a signal responsive to the melting and collapse of said energy director; and in response to said signal, lowering said motional amplitude and applying a second engaging force to said horn for the remainder of said predetermined time interval so as to continue to heat said surfaces of both of said parts at a second heating rate lower than said first heating rate, and at a temperature sufficient to weld said surfaces together under said engaging force.

4. The method of claim 3 wherein said step of lowering said motional amplitude results in minimizing the visible flash between said surfaces of said parts following welding.

5. The method of claim 3 wherein said step of lowering said motional amplitude further results in minimizing voids within said weld between said surfaces of said parts.

6. The method of claim 3 wherein said step of lowering said motional amplitude results in increased randomization in the orientation of the polymer chains of said thermoplastic between said surfaces of said parts following welding, increasing the tensile strength of said weld.

7. The method of claim 3 wherein said step of lowering said motional amplitude results in reduced residual stress in said weld.

8. The method of claim 3 wherein said second engaging force is lower than said first engaging force.

9. The method of claim 8 wherein said first engaging force reduces the weld cycle time.

10. The method of claim 8 wherein the step of applying said second engaging force alters the flow rate of melted material within said weld.

11. The method of claim 8 wherein the step of applying said second engaging force results in an increased randomization in the orientation of the polymer chains of said thermoplastic between said surfaces of said parts following welding, increasing the tensile strength of said weld.

12. The method of welding by ultrasonic energy two thermoplastic workpieces to one another during a weld cycle along a common interface surface, comprising:

providing a horn adapted to be resonant at a predetermined ultrasonic frequency;

engaging said horn with an initial engaging force with said workpieces;

rendering said horn resonant with motional amplitude at said predetermined ultrasonic frequency, so as to transmit ultrasonic vibrations to said interface surface whereby the dissipation of ultrasonic energy causes a softening and flowing of thermoplastic material at said interface;

varying said engaging force over a predetermined force profile throughout said weld cycle; and simultaneous to varying said engaging force, varying said motional amplitude of said horn over a predetermined amplitude profile.

13. The method of claim 12 wherein said predetermined force profile is selected to increase weld strength and reduce said weld cycle time.

14. The method of claim 12 wherein said predetermined amplitude profile is selected to optimize heating at said interface surface.

15. The method of claim 12 wherein said predetermined amplitude profile is selected to randomize the alignment of polymer chains with said weld, increasing weld strength and reducing residual stress.

16. A method of operating on a thermoplastic workpiece during a work cycle utilizing a high frequency vibration ultrasonic apparatus, said apparatus comprising an electroacoustic transducer which transmits such vibrations to a horn which is dimensioned to be resonant and which is in forced engagement with the workpiece to be processed, said method comprising the steps of:

establishing forceful contact between said horn and workpiece;

energizing said electroacoustic transducer so as to resonate said horn with a desired motional amplitude;

varying said forceful contact between said horn and said workpiece in accordance with a desired force profile throughout said work cycle; and varying said motional amplitude of said horn in accordance with a desired motional amplitude profile throughout said work cycle.

17. A method of welding two thermoplastic workpieces together during a weld cycle utilizing a high frequency vibration ultrasonic apparatus, said apparatus comprising an electroacoustic transducer which transmits such vibrations to a horn which is dimensioned to be resonant and which is in forced engagement with at least one of the workpieces to be welded, said method comprising the steps of:

establishing forceful contact between said horn and workpieces such that said workpieces are in engagement with one another at least along areas constituting a weld line to be formed;

energizing said electroacoustic transducer so as to resonate said horn with a desired motional amplitude;

varying said forceful contact between said horn and said one workpiece throughout said work cycle in accordance with a desired force profile; and varying said motional amplitude of said horn during said weld cycle in accordance with a desired motional amplitude profile.

18. The method of claim 17 wherein the step of varying said forceful contact of said horn comprises contacting said electroacoustic transducer with said workpieces for a first portion of said weld cycle within a first range of contact forces for accelerating heating and melting at least portions of said workpieces generally within said weld line, and then contacting said electroacoustic transducer with said workpieces within another range of contact forces for maintaining contact with said workpieces in the general area of said weld line sufficient to effect welding of said workpieces to one another.

19. The method of claim 17 wherein said step of varying said motional amplitude of said horn comprises energizing said electroacoustic transducer for a first portion of said weld cycle within a first range of power levels for preheating at least portions of said workpieces generally within said weld line, and then energizing said electroacoustic transducer for the remainder of said weld cycle within another range of power levels for heating both of said workpieces in the general area of said weld line to a temperature sufficient to effect welding of said workpieces to one another.

20. The method of claim 19 wherein said step of energizing said electroacoustic transducer during said first portion of said weld cycle comprises gradually increasing the motional amplitude of said electroacoustic transducer from about 5% to about 80% of its full motional amplitude so as to preheat said portions of said workpieces.

21. The method of claim 19 wherein said step of energizing said electroacoustic transducer during said first portion of said weld cycle involves gradually increasing said power level from a low level to a higher level within said first range of power levels so as to effect at least partially melting of said workpieces along said weld line.

22. The method of claim 21 wherein the motional amplitude of said electroacoustic transducer is gradually increased from about 10% to about 40% of its full motional amplitude.

* * * * *